Aug. 6, 1957     D. B. MacKENDRICK     2,802,091
ELECTRIC PLATE WARMER
Filed Oct. 18, 1954     2 Sheets-Sheet 1
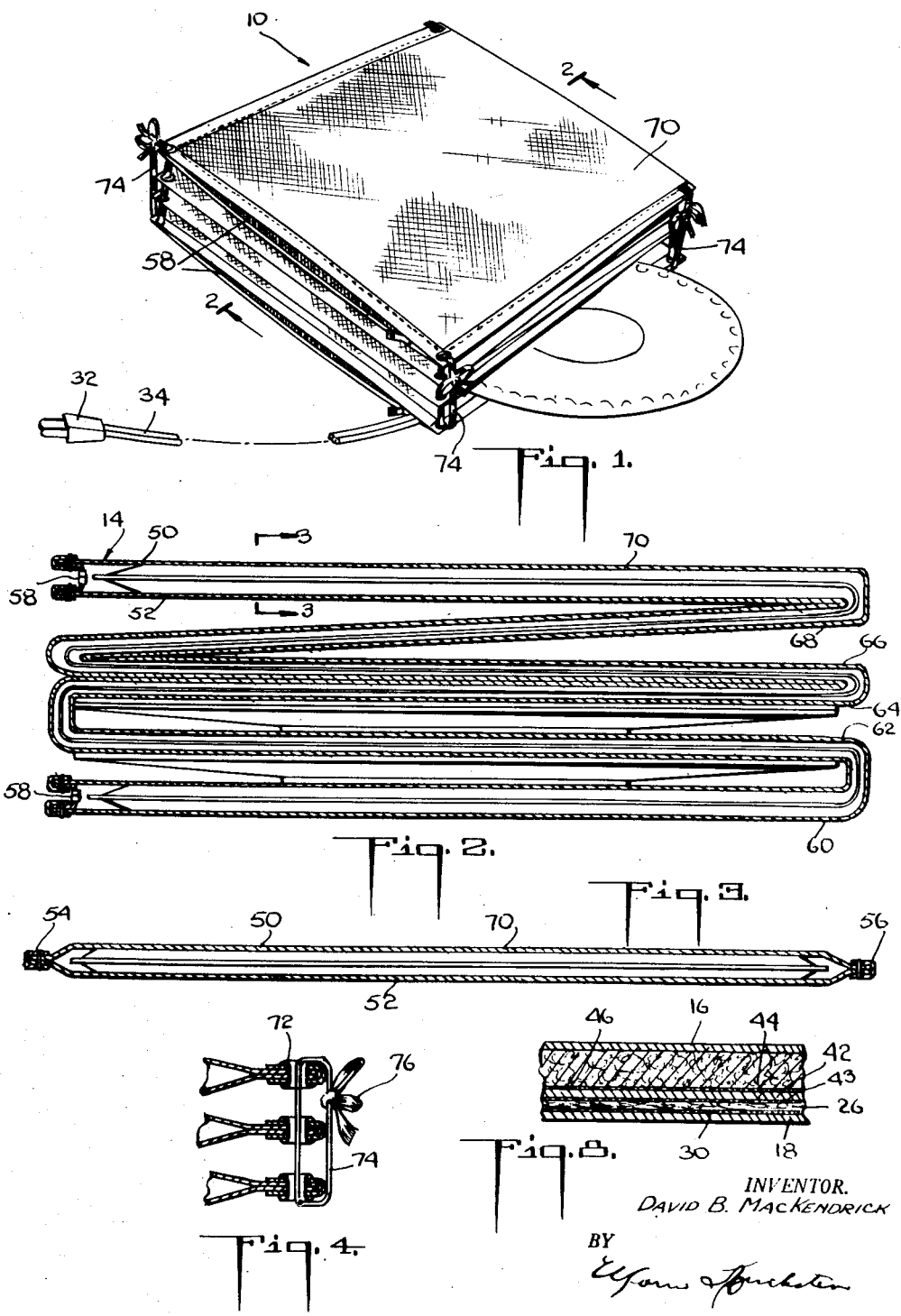
INVENTOR.
DAVID B. MACKENDRICK
BY
ATTORNEY

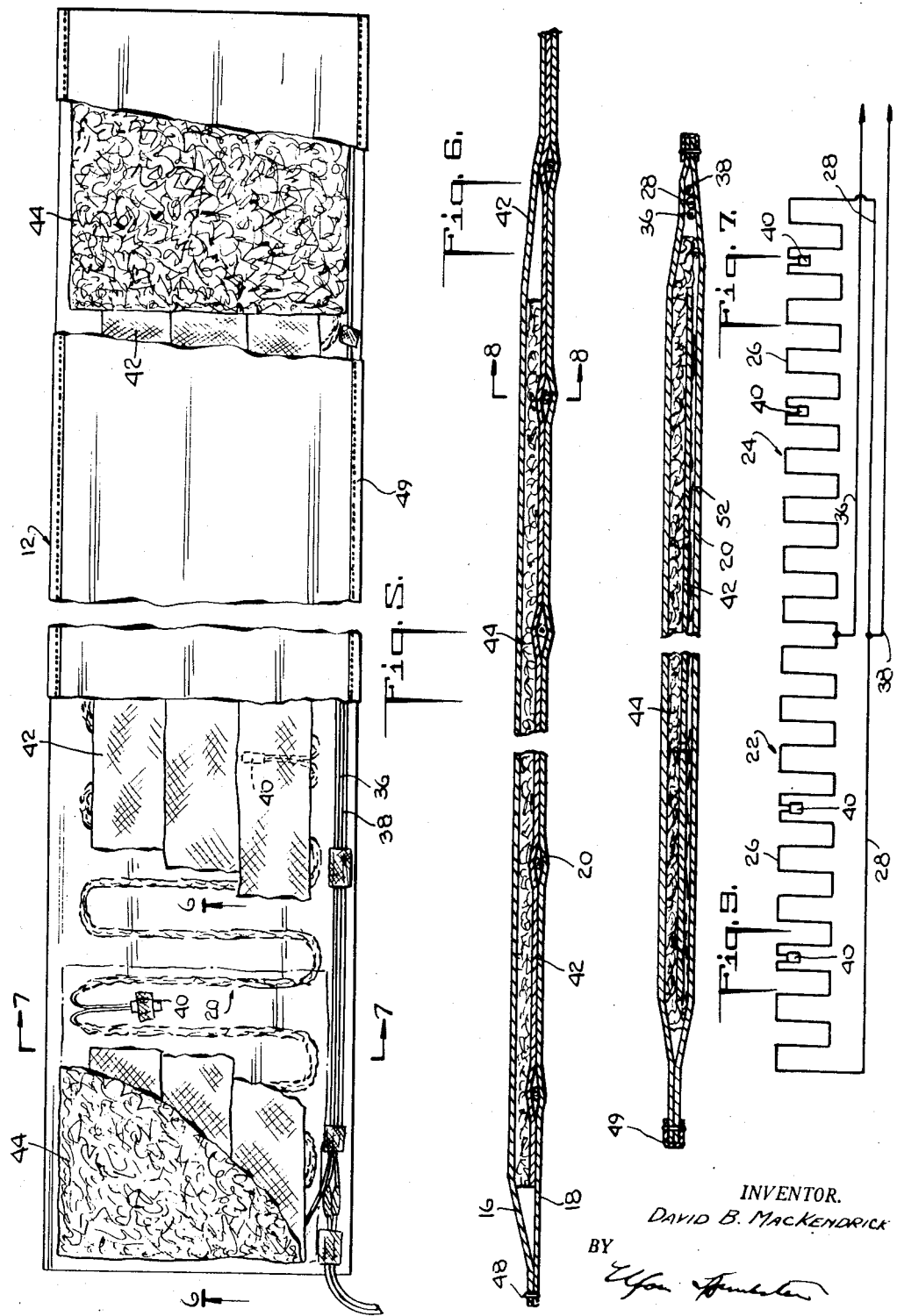

United States Patent Office 2,802,091
Patented Aug. 6, 1957

2,802,091

ELECTRIC PLATE WARMER

David B. MacKendrick, New York, N. Y., assignor to Kaz Manufacturing Co., Inc., New York, N. Y., a corporation of New York Application October 18, 1954, Serial No. 462,865

4 Claims. (Cl. 219—46)

This invention relates to an electric plate warmer.

It is an object of my invention to provide a light, efficient, economical, compact, speedy and attractive device for warming and maintaining service plates warm.

It is another object of my invention to provide a plate warmer of the character described which can accommodate varying numbers of plates of different diameters.

It is another object of my invention to provide a plate warmer of the character described which is convenient to store and whose cover although of complex contour can easily be removed from the heating element for washing.

Other objects of my invention in part will be obvious and in part will be pointed out hereinafter.

My invention accordingly consists in the features of construction, combinations of elements and arrangement of parts which will be exemplified in the plate warmer hereinafter described and of which the scope of application will be indicated in the appended claims.

In the accompanying drawings in which is shown one of the various possible embodiments of my invention, Fig. 1 is a perspective view of the new plate warmer;

Fig. 2 is an enlarged sectional view taken substantially along the line 2—2 of Fig. 1 and showing a few serving plates in position;

Fig. 3 is a sectional view taken substantially along the line 3—3 of Fig. 2;

Fig. 4 is a fragmentary vertical sectional view through a corner of the plate warmer, the same being illustrative of the means expansibly interconnecting several warming panels at a corner of the plate warmer;

Fig. 5 is a fragmentary developed view of the warming strip;

Figs. 6 and 7 are enlarged fragmentary views taken substantially along the lines 6—6 and 7—7 respectively of Fig. 5;

Fig. 8 is an enlarged fragmentary view taken substantially along the line of 8—8 of Fig. 6, and Fig. 9 is a diagram of the heating circuit for the warming strip.

Referring now in detail to the drawings, the reference numeral 10 denotes a plate warmer embodying my invention. Said warmer includes an elongated rectangular flat warming strip 12 enclosed in an elongated rectangular flat envelope 14.

The warming strip 12 includes a cover comprising an upper ply 16 and a lower ply 18. The two plies desirably are made from cloth and preferably are waterproofed, as by an outer coating of a water-impervious material such as rubber. The interior surfaces of the two plies maintain the absorbent characteristic of cloth.

The lower ply 18 serves as a support for an areal electric heating means 20. Said heating means may be of any type well-known to the art and as shown herein constitutes two flat rectangular heating coils 22, 24, (Fig. 9). Each heating coil includes a serpentine section 26 of resistance wire, e. g. an asbestos core around which a helix of a copper nickel strand is wound, the helix and core being covered by an asbestos sheath. Each coil further includes a straight section 28 which is a continuation of one of the ends of the serpentine section and runs alongside the same.

In the illustrated form of my invention, the two serpentine sections are joined to form a single serpentine length which extends from near one end to near the other end of the strip 12. Similarly the two straight sections 28 are continuous, forming a straight line which joins the ends of the serpentine length.

The resistance wire is applied and secured to the panel 18 in any manner well-known to the art, as for example, in the fashion shown in my U. S. Patent No. 2,423,196 dated July 1, 1947 for Flexible Electric Heater and An Apparatus and Method For Making the Same. Thus, the resistance wire is adhered to the lower ply 18 by an adhesive coating 30 (Fig. 8).

Power is supplied to the two heating coils from a plug 32 and duplex lead-in cord 34 through a pair of insulated low resistance conductor wires 36, 38, one of which is connected to the junction between the two serpentine sections and the other of which is connected to the junction between the two straight sections so that both coils are arranged for connection to a source of electric power in parallel.

In conformity with safety regulations, several thermostats 40 are series connected at appropriate points in the coils.

The exposed faces of the coils are covered by a plurality of broad fabric bands 42 which overlie the coils and are secured thereto as by an adhesive coating 43. A protective cushion, e. g. a felted jute layer 44, covers the heating coils adjacent the ends of the strip. Said layers are secured to the tape 42 by an adhesive coating 46.

The sides and ends of strip 12 are suitably interconnected in any convenient manner, e. g. by stitching 48, and, if desired, some of the edges, for example the longitudinal edges, may be finished off with binding or piping 49.

The envelope 14 can be made of any suitable sheet material and to this end I have illustrated the envelope as comprising upper and lower broad lengths 50, 52 of cloth. The longitudinal edges of the lengths are secured to one another as by stitching 54 being finished off with piping 56. Both ends of the envelope are open but each is adapted to be closed by an openable closure, e. g. a slide fastener 58.

The warming strip 12 is disposed with the envelope 14 being almost as long and as wide as the same whereby to substantially fill the envelope. The strip can be introduced through either end of the envelope when the corresponding slide fastener is opened and will be captively held therein upon closure of the slide fastener.

The envelope and the enclosed warming strip are transversely folded to form several, i. e. three or more, superposed registered flexible limp warming panels. In the plate warmer shown herein, the envelope and warming strip are folded to provide six such warming panels 60, 62, 64, 66, 68, 70. Desirably, the shape of the panels is substantially the same as the shape of the protective layers 44 and these layers are so located as to be on the outside of the exposed sections of the heating coils in the outermost warming panels. Thus, the layers 44 in addition to affording protection to the coils assist in defining the size of the warming panels and the initial fold lines and also act as heat insulators. For the sake of appearance and for maximum utility, the warming panels are made of equal depth and width, i. e. square.

Suitable means is provided to expansibly join the warming panels to one another at a plurality of points which may include the fold lines in order to prevent panels from opening up, and so that the panels can move toward and away from one another while substantially maintaining their parallel positions. Said means may comprise an eyelet 72 through each pair of adjacent warming panels at each end of each fold line and through each corner of each end of the envelope 14. All the eyelets at each corner of the warming device are in alignment. It is pointed out that the eyelets merely pass through the material of the envelope and not through the warming strip 12. A flexible elongated member 74 extends through each set of registered eyelets at each corner of the plate warmer. The ends of the member are interconnected whereby to captively hold to one another the corners of said panels at each corner of the plate warmer. The member 74 is expansible to permit the eyelets 72 to be moved away from one another. For example, said member may be elastic or it may be sufficiently long to permit accommodation of the requisite number of plates. The ends of the member 74 are detachably interconnected, as by a knot 76, thus allowing a user to remove said member when desired.

When the envelope and warming strip are folded as described above to provide the sundry warming panels, it will be appreciated that the compartment between each pair of panels provides a warming space into which one or more serving plates may be inserted from any one of the three open sides of the compartment exclusive of the side defined by the fold. Inasmuch as the folds are flexible and limp, any two adjacent panels can be moved apart a variable distance. This enables the plate warmer to accommodate either a single serving plate or two or even three serving plates between each pair of warming panels. The members 74 which keep the panels in overlying registration permit such relative expansion of the panels.

If it is desired to remove the warming panel 12 in order to repair or replace the same or to allow laundrying of the envelope 14, the four members 74 are removed, the envelope 14 is straightened out, one of the slide fasteners is opened and the warming strip simply slid out of the envelope.

It thus will be seen that I have provided an electric plate warmer which achieves the several objects of my invention and is well adapted to meet the conditions of practical use.

As various possible embodiments might be made of my invention and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An electric plate warmer comprising at least three superimposed registered flexible limp electric warming panels having at least an electric heating element incorporated therein and integrally interconnected by folds, said panels defining a plurality of electric heating compartments and including a one piece areal warming strip coextensive with all of said panels, an elongated envelope of heat transfer material surrounding said strip having an access opening along at least one edge thereof and means independent of the folds to interconnect said panels.

2. A flexible, limp, electric plate warmer as in claim 1, wherein said warming strip includes an upper ply, a lower ply, both of said plies being made of a heat absorbent material and a waterproof outer covering integrally surrounding said plies.

3. A flexible, limp, electric plate warmer, as in claim 2, wherein said waterproof covering is rubber.

4. A flexible, limp, electric plate warmer as in claim 3, wherein said electric heating element is adhered to said lower ply.

References Cited in the file of this patent

UNITED STATES PATENTS

| | | |
|---|---|---|
| 840,857 | Matcovitch | Jan. 8, 1907 |
| 893,015 | Ripley | July 14, 1908 |
| 2,139,153 | Frolich | Dec. 6, 1938 |
| 2,190,225 | Vollmer | Feb. 13, 1940 |
| 2,456,468 | Theodore | Dec. 14, 1948 |
| 2,570,376 | Quist | Oct. 9, 1951 |
| 2,712,591 | Rogell | July 5, 1955 |